United States Patent [19]

Smutny et al.

[11] Patent Number: 4,954,555
[45] Date of Patent: Sep. 4, 1990

[54] STABILIZED CARBON MONOXIDE-OLEFIN COPOLYMER COMPOSITIONS

[75] Inventors: Edgar J. Smutny, Houston, Tex.; Robert G. Lutz, Santa Rosa, Calif.

[73] Assignee: Shell Oil Company, Houston, Tex.

[21] Appl. No.: 358,218

[22] Filed: May 30, 1989

[51] Int. Cl.$^5$ ............................................. C08K 5/09
[52] U.S. Cl. ................................................... 524/399
[58] Field of Search .................. 524/399; 528/392; 525/125, 126, 124

[56] References Cited

U.S. PATENT DOCUMENTS

| | | | |
|---|---|---|---|
| 2,985,617 | 5/1961 | Solyer et al. | 524/399 |
| 3,676,401 | 7/1972 | Henry | 523/126 |
| 3,694,412 | 9/1972 | Nozaki | 260/63 CQ |
| 3,753,952 | 8/1973 | Guillet | 523/125 |

FOREIGN PATENT DOCUMENTS

| | | |
|---|---|---|
| 121965 | 10/1984 | European Pat. Off. . |
| 181014 | 5/1986 | European Pat. Off. . |
| 213671 | 3/1987 | European Pat. Off. . |
| 257663 | 3/1988 | European Pat. Off. . |

OTHER PUBLICATIONS

Gerald Scott: *Developments in Polymer Stabilization-5*, 71-85 (1982).

Primary Examiner—Veronica P. Hoke

[57] ABSTRACT

Linear alternating polymrs of carbon monoxide and at least one ethylenically unsaturated hydrocarbon are provided increased melt stability by the inclusion therein of aluminum stearate.

11 Claims, No Drawings

STABILIZED CARBON MONOXIDE-OLEFIN COPOLYMER COMPOSITIONS

FIELD OF THE INVENTION

This invention relates to stabilized compositions comprising linear alternating polymers of carbon monoxide and at least one ethylenically unsaturated hydrocarbon. More particularly, the present invention relates to compositions comprising such polymers stabilized against loss of crystallinity by the inclusion therein of aluminum stearate.

BACKGROUND OF THE INVENTION

The class of polymers of carbon monoxide and olefin(s) has been known for a number of years. Brubaker, U.S. Pat. No. 2,495,286, produced such polymers of relatively low carbon monoxide content in the presence of free radical initiators, e.g., peroxy compounds. U.K. 1,081,304 produced similar polymers of higher carbon monoxide content in the presence of alkylphosphine complexes of palladium salts as catalyst. Nozaki extended the reaction to produce linear alternating polymers in the presence of arylphosphine complexes of palladium moieties and certain inert solvents. See, for example, U.S. Pat. No. 3,964,412.

More recently, the class of linear alternating polymers of carbon monoxide and at least one ethylenically unsaturated hydrocarbon has become of greater interest in part because of the greater availability of the polymers. The more recent general process for the production of the linear alternating polymers is illustrated by a number of published European Patent Applications including 121,965, 181,014, 213,671 and 257,663. The process usually involves the use of a catalyst formed from a compound of a Group VIII metal selected from palladium, cobalt or nickel, the anion of a non-hydrohalogenic acid having a pKa below about 6, preferably below 2, and a bidentate ligand of phosphorus, arsenic or antimony.

The resulting polymers are relatively high molecular weight materials having established utility as premium thermoplatics in the production of shaped articles such as containers for food and drink by procedures which are conventionally employed with thermoplastics. Although the linear alternating polymers are crystalline with defined melting points, the polymers do tend to lose crystallinity when exposed to multiple melting/solidification cycles. This apparent loss of crystallinity results in decreases in certain of the desirable properties of the polymers. It would be of advantage to provide compositions of the linear alternating polymers which have been stabilized against such loss of crystallinity, i.e., which have a higher melt stability.

SUMMARY OF THE INVENTION

This invention provides compositions of a linear alternating polymer of carbon monoxide and at least one ethylenically unsaturated hydrocarbon which are stabilized against undue loss of crystallinity upon repeated melting/crystallization cycles. More particularly, the invention provides such compositions which are stabilized against undue loss of crystallinity by the inclusion therein of aluminum stearate.

DESCRIPTION OF THE INVENTION

The polymers which are stabilized according to the invention are the linear alternating polymers of carbon monoxide and at least one ethylenically unsaturated hydrocarbon which are now commonly referred to as polyketones or polyketone polymers. The ethylenically unsaturated hydrocarbons which are useful as precursors of the polyketone polymers have up to 20 carbon atoms inclusive, preferably up to 10 carbon atoms inclusive, and are aliphatic including ethylene and other alpha-olefins such as propylene, 1-butene, isobutylene, 1-hexene, 1-octene and 1-docecene, or are arylaliphatic having an aryl substituent on an otherwise aliphatic molecule, particularly an aryl substituent on a carbon atom of the ethylenic unsaturation. Illustrative of this latter class of ethylenically unsaturated olefins are styrene, p-methylstyrene, p-ethylstyrene and m-isopropylstyrene. Preferred polyketone polymers are copolymers of carbon monoxide and ethylene or terpolymers of carbon monoxide, ethylene and a second hydrocarbon of at least 3 carbon atoms, particularly an alpha-olefin such as propylene.

When the preferred terpolymers of carbon monoxide, ethylene and a second hydrocarbon are employed in the compositions of the invention, there will be at least about two units incorporating a moiety of ethylene for each unit incorporating a moiety of the second hydrocarbon. Preferably there will be from about 10 to about 100 units incorporating ethylene for each unit incorporating a second hydrocarbon. The polymer chain of the preferred polymers is therefore represented by the repeating formula

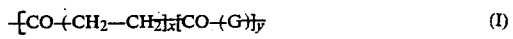  (I)

wherein G is a moiety of the second hydrocarbon polymerized through the ethylenic unsaturation. The —CO—(CH$_2$—CH$_2$)— units and the —CO—(G)— units are formed randomly throughout the polymer chain and the ratio of y:x is no more than about 0.5. In the modification of the invention where copolymers of carbon monoxide and ethylene are employed without the presence of a second hydrocarbon, the polymers are represented by the above formula I wherein y is 0. When y is other than 0, i.e., terpolymers are employed, ratios of y:x from about 0.01 to about 0.1 are preferred. The end groups or "caps" of the polymers will depend upon what materials are present during the production of the polymers and how or whether the polymer was purified. The precise nature of the end groups is of little significance so far as the overall properties of the polymers are concerned so that the polymer is fairly represented by the polymer chain as depicted above.

Of particular interest are the polymers of the above formula having a molecular weight from about 1000 to about 200,000, especially those of molecular weight of from about 20,000 to about 90,000 as determined by gel permeation chromatography. The physical properties of the polymers will depend in part upon the molecular weight, whether the polymer is a copolymer or a terpolymer and, in the case of terpolymers the nature of and the proportion of the second hydrocarbon present. Typical melting points for such polymers are from about 175° C. to about 300° C., more often from about 210° C. to about 270° C. The polymers will have a limiting viscosity number (LVN), measured as dl/g in m-cresol at 60° C., of from about 0.5 to about 10, preferably from about 0.8 to about 4.

These polymers are produced by the general methods of the above published European Patent Applications.

Although the scope of the polymerization is extensive, a preferred catalyst composition for such polymerization is formed from a palladium salt, particularly a palladium alkanoate such as palladium acetate, the anion of trifluoroacetic acid or p-toluenesulfonic acid, and a bidentate ligand of phosphorus such as 1,3-bis(diphenylphosphino) propane or 1,3-bis[di(2-methoxyphenyl) phosphino]propane. The reactants are typically contacted in the presence of the catalyst composition under polymerization conditions in an inert reaction diluent. Suitable reaction diluents include lower alkanols such as methanol or ethanol, lower alkyl ketones such as acetone and methyl ethyl ketone, or mixtures thereof. Typical polymerization conditions include a reaction temperature from about 20° C. to about 150° C., preferably from about 30° C. to about 135° C. The suitable reaction pressures are from about 10 bar to about 200 bar, but reaction pressures from about 20 bar to about 100 bar are preferred. Subsequent to reaction, the polymer is recovered from the polymer-containing suspension by conventional procedures such as filtration or decantation.

The polyketone polymers of the invention are stabilized against loss of crystallinity during repeated melting/crystallization cycles by the inclusion therein of a stabilizing quantity of aluminum stearate. The role of aluminum stearate is apparently unique as other related metal stearates, e.g., zinc stearate, are not effective for this process. The precise physical character of the aluminum stearate is not critical. It is a chemical of commerce or is produced by reaction of an aluminum oxide with stearic acid. The aluminum stearate is employed in a stabilizing quantity and suitable quantities are from about 0.005% by weight to about 10% by weight, based on total composition, preferably from about 0.05% by weight to about 3% by weight on the same basis.

The compositions of the invention are intimate mixtures of the polyketone polymer and the aluminum stearate stabilizer. The method of producing the mixture is not material and conventional methods of producing an intimate mixture of a thermoplastic polymer and a stabilizer are suitably employed. In one modification, the polymer in a finely divided form is mixed with aluminum stearate powder and the resulting mixture is passed through an extruder to obtain the mixture as an extrudate. In an alternate method, the composition is produced in a mixing device such as a mixer or a blender operating at high shear. The stabilized compositions may contain other additives such as colorants, plasticizers, fibers, reinforcements and dyes which are added to the polymer together with or separately from the aluminum stearate.

The resulting compositions will have an improved melt stability as evidenced by a relatively constant apparent crystallinity when subjected to melt processing operations of melting and crystallization. This improvement in retained apparent crystallinity offers considerable advantages which are not to be found when unstabilized polymers are utilized. For example, in a typical processing scheme, the stabilized composition is converted into nibs by passage through an extruder. The nibs are then often injection molded to produce a shaped article, in each case without substantial decrease in crystallinity as determined by a relatively constant melting point or other related physical property. The compositions of the invention are particularly useful in this and other applications which require a series of melting and solidification cycles. When the compositions of the invention are also usefully processed by conventional techniques which do not involve melting and soldification of the polymer, the advantages of the stabilized compositions are most apparent when melt processing operations do involve the melting and soldification of the polymer are employed. Thus, the compositions of the invention are useful for a variety of applications as premium thermoplastics as is now known in the art. The compositions are particularly useful for the production of shaped articles typically requiring a number of melt-solidification cycles in their production. Illustrative of such articles are containers for food and drink and parts and housing for automotive applications.

The invention is further illustrated by the following Illustrative Embodiments which should not be construed as limiting the invention.

ILLUSTRATIVE EMBODIMENT I

A terpolymer (EP 87/032), of carbon monoxide, ethylene and propylene was produced in the presence of a catalyst composition formed from palladium acetate, trifluoroacetic acid and 1,3-bis[di(2-methoxyphenyl)-phosphino]propane. This polymer, termed Polymer A, had a melting point of 220° C. and an LVN, measured in m-cresol at 60° C., of 1.96 dl/g.

ILLUSTRATIVE EMBODIMENT II

In this Ilustrative Embodiment, measurements of melting points and crystallization temperatures, or alternatively heats of melting and heats of fusion, were made by the use of a Perkin-Elmer differential scanning calorimeter (DSC) which employs samples of polymer or polymer composition in sealed pan containers. The pan and contents are heated at a controlled rate, typically 20° C./minute, until reaching the temperature at which the sample has melted, $T_m1$. The pan and contents are then cooled until the temperature where the sample has solidified, $T_c1$, is reached and then heated past a second melting point, $T_m2$, to 285° C. at which temperature the sample is maintained for 10 minutes. The pan and contents are then cooled until the sample has solidified a second time, $T_22$. The melting and crystallization temperatures are defined as the temperatures at which the heat flow reaches a maximum (for melting) or a minimum (for crystallization). Typically the melting point $T_m$ will be higher than the temperature of crystallization $T_c$ and each will decrease somewhat on repeated melting/soldification cycles. Although a number of factors influence the melting point and crystallization temperatures, these values are also influenced by the crystallinity of the polymer. In general, the smaller the difference between the first and second melting points, or the first and second crystallization temperatures, the greater the degree of retained crystallinity.

It is also possible to determine through the use of a DSC the magnitude of the first and second heats of melting ($H_1$ and $H_2$) in cal/g and the first and second heats of crystallization ($C_1$ and $C_2$), also in cal/g, for the unstabilized polymer and for stabilized compositions. In general, the heats of crystallization will be higher for the stabilized composition than for the unstabilized polymers. The higher the ratio of $C_2/C_1$ is, the greater the degree of retained crystallinity.

Compositions of the terpolymer of Illustrative Embodiment I and aluminum stearate were produced by placing appropriate quantities of the terpolymer and aluminum stearate, each in a finely divided state, in a plastic bottle and tumbling the mixture overnight at ambient temperature. The resulting dry mixture was extruded through a 15 mm twin screw Baker Perkins extruder in air. These compositions, as well as the unstabilized polymer, were evaluated by the DSC technique described above. The results are shown in Table I, together with a similar blend prepared by using zinc stearate in place of the aluminum stearate.

TABLE I

| Sample | % wt, stearate | $T_c2$ | $C_2/C_1$ |
|---|---|---|---|
| Polymer A | 0 | 156 | 0.78 |
| Compositions | 0.1, Al | 155 | 0.82 |
| | 1, Al | 152 | 0.69 |
| | 1, Al | 154 | 0.80 |
| | 5, Al | 153 | 0.75 |
| | 14, Al | 112 | 0.21 |
| | 0.1, Zn | 103 | 0.13 |
| | 1, Zn | 0 | 0 |

Results similar to those when the composition containing zinc stearate was evaluated were obtained when iron stearate and sodium stearate were evaluated in a terpolymer similar to Polymer A.

What is claimed is:

1. A composition stabilized against undue loss of crystallinity when subjected to melting and solidification which comprises a linear alternating polymer of carbon monoxide and at least one ethylenically unsaturated hydrocarbon, wherein the polymer is of the repeating formula

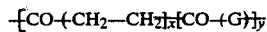

wherein G is a moiety of an ethylenically unsaturated hydrocarbon of at least 3 carbon atoms polymerized through the ethylenic unsaturation and the ratio of y:x is no more than about 0.5, and a stabilizing quantity of aluminum stearate.

2. The composition of claim 1 wherein the amount of aluminum stearate is from about 0.005% to about 10% by weight, based on total composition.

3. The composition of claim 2 wherein y is 0.

4. The composition of claim 2 wherein th ratio of y:x is from about 0.01 to about 0.1.

5. The composition of claim 4 wherein G is a moiety of propylene.

6. A method of stabilizing a linear alternating polymer of carbon monoxide and at least one ethylenically unsaturated hydrocarbon against undue loss of crystallinity when subjected to melting and solidification which comprises incorporating a stabilizing quantity of aluminum stearate into the linear alternating polymer, wherein the polymer is represented by the repeating formula

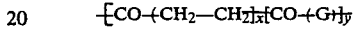

wherein G is the moiety of an ethylenically unsaturated hydrocarbon of at least 3 carbon atoms polymerized through the ethylenic unsaturation and the ratio of y:x is no more than about 0.5

7. The method of claim 6 wherein the quantity of aluminum stearate is from about 0.005% to about 10% by weight, based on total composition.

8. The method of claim 7 wherein y is 0.

9. The method of claim 7 wherein the ratio of y:x is from about 0.01 to about 0.1.

10. The method of claim 9 wherein G is a moiety of propylene.

11. The method of claim 10 wherein the quantity of aluminum stearate is from about 0.05% to about 3% by weight, based on total composition.

* * * * *